UNITED STATES PATENT OFFICE.

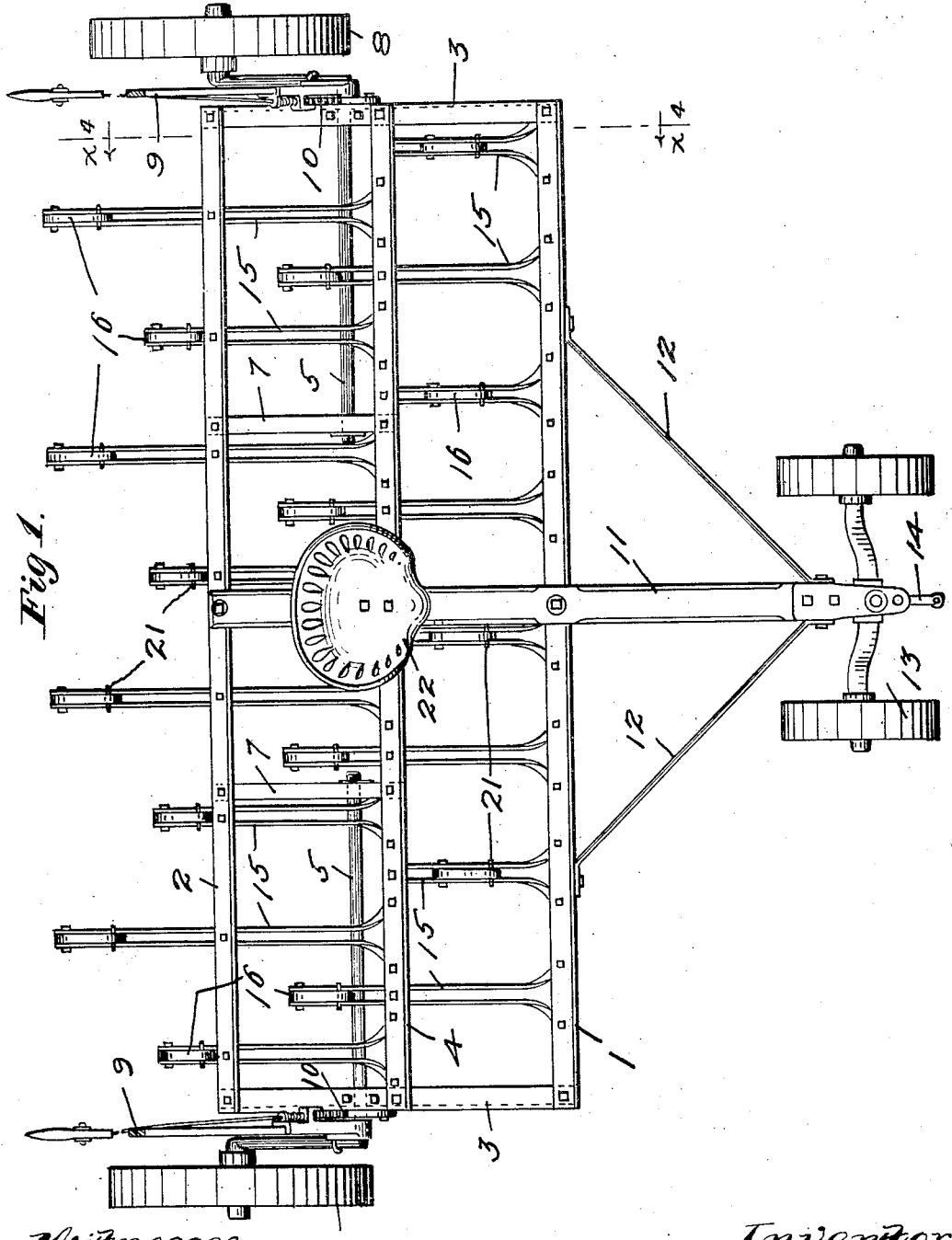

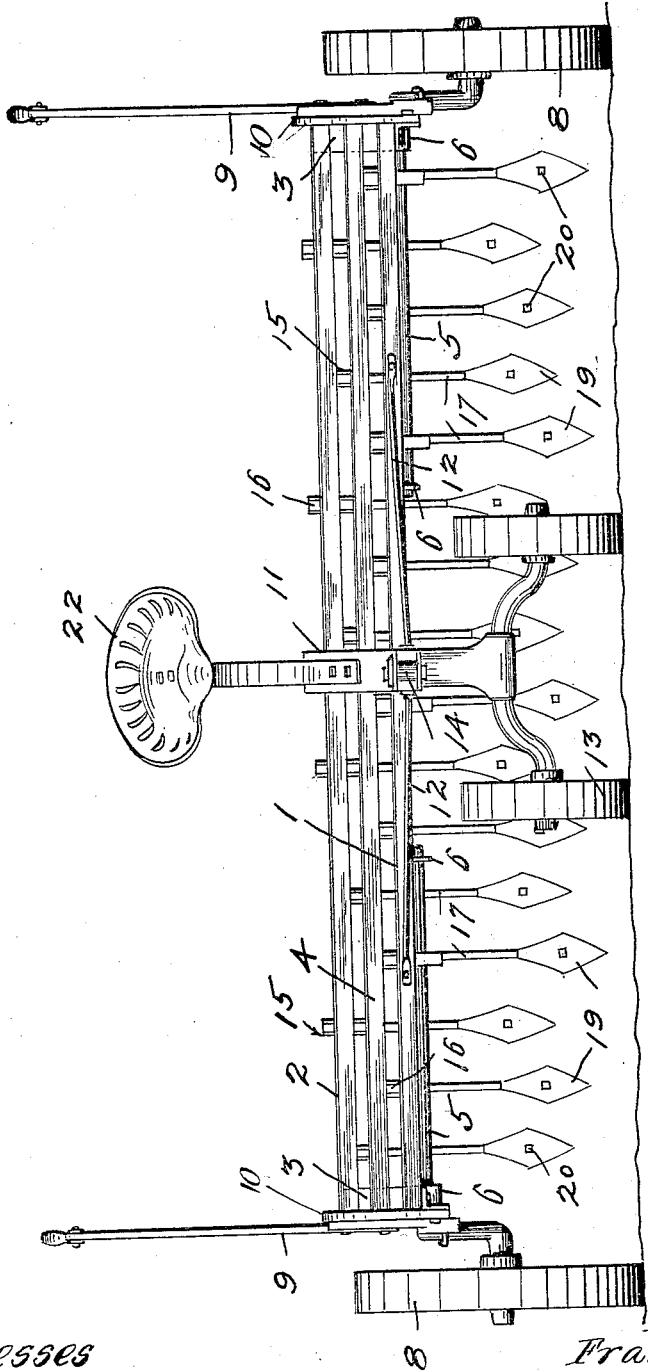

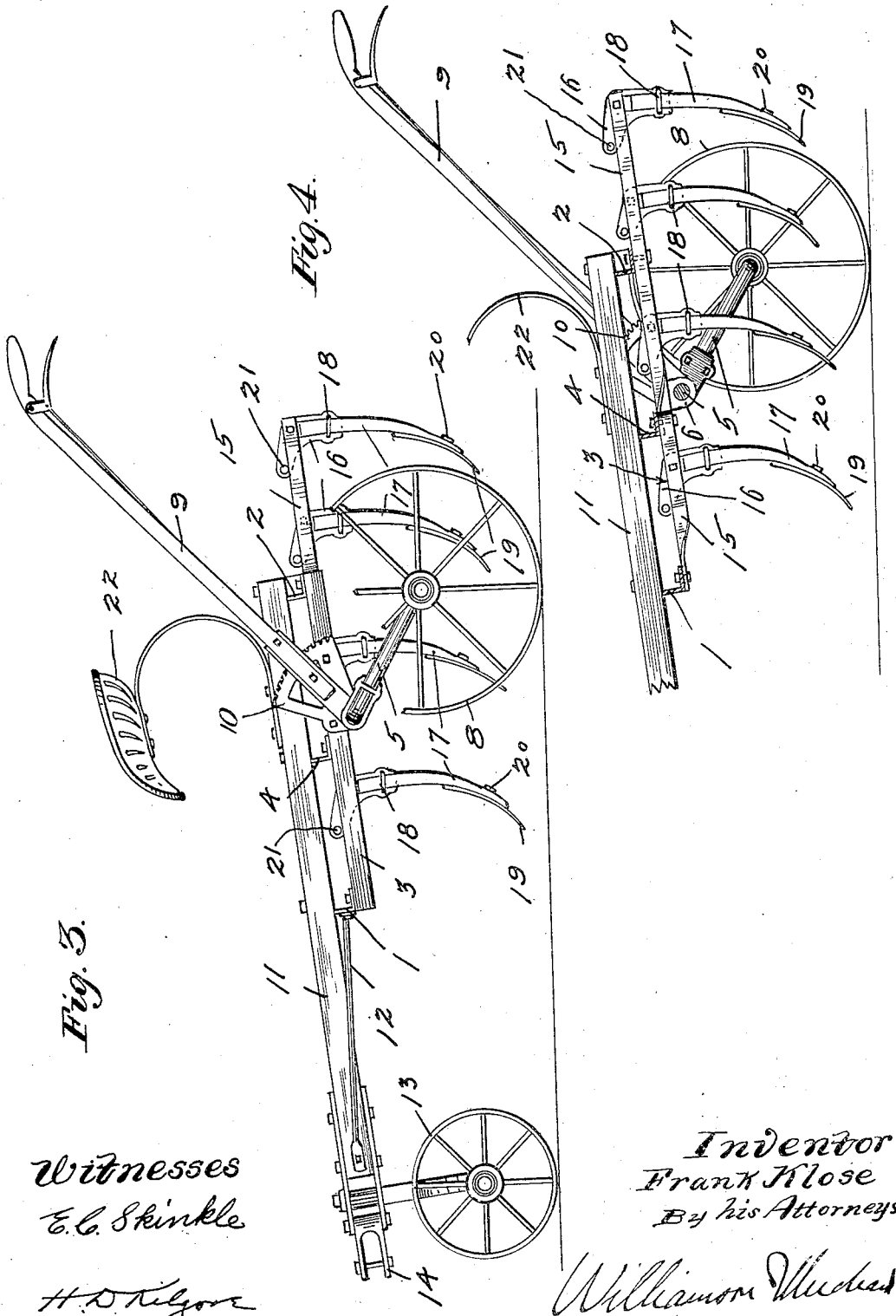

FRANK KLOSE, OF ST. JAMES, MINNESOTA.

QUACK-GRASS DIGGER.

1,251,050.  Specification of Letters Patent.  Patented Dec. 25, 1917.

Application filed October 21, 1914. Serial No. 867,702.

*To all whom it may concern:*

Be it known that I, FRANK KLOSE, citizen of the United States, residing at St. James, in the county of Watonwan and State of Minnesota, have invented certain new and useful Improvements in Quack-Grass Diggers; and I do hereby declare the following to be a full, clear, and exact description of the invention, such as will enable others skilled in the art to which it appertains to make and use the same.

My invention has for its object to provide an extremely simple and highly efficient quack-grass digger; and, to this end, it consists of the novel devices and combinations of devices hereinafter described and defined in the claim.

In the accompanying drawings, which illustrate the invention, like characters indicate like parts throughout the several views.

Referring to the drawings,

Figure 1 is a plan view of the improved machine;

Fig. 2 is a front elevation of the same;

Fig. 3 is a side elevation of the same, some parts being broken away; and

Fig. 4 is a vertical section, taken on the line $x^4$ $x^4$ of Fig. 1, some parts being broken away.

The frame of the machine is of skeleton form and comprises front, rear and side bars, 1, 2 and 3, respectively, rigidly connected in rectangular arrangement. An intermediate bar 4 is extended parallel to the bars 1 and 2 and rigidly secured at its ends to the intermediate portions of the side bars 3. All of the bars 1 to 4, inclusive, are, as shown, preferably formed from commercial angle irons.

A pair of axially alined crank axles 5 is journaled in depending bearings 6 rigidly secured to the side bars 3 and to short intermediate bars 7, secured to the frame bars 2 and 4. Ground-engaging wheels 8 are journaled on the crank ends of the axles 5. Rigidly secured to each crank axle 5 is a latch lever 9, arranged for coöperation with a lock segment 10, rigidly secured to the respective side bar 3. Obviously, by adjusting these latch levers 9 the crank axles 5 may be oscillated to raise and lower the machine frame and to positively lock the same in different elevations.

A forwardly projecting stub pole 11 is rigidly bolted to the intermediate portions of the frame bars 1, 2 and 4. Rearwardly diverging brace rods 12 are anchored to the front end of the stub pole 11 and to the frame bar 1. The front end of this stub pole 11 is supported on a small two-wheeled truck 13, swiveled to said pole for caster-like movement. A draft connection 14 is also secured to the front end of the stub pole 11.

Rearwardly-projecting drag bars 15, comprising laterally spaced members, are rigidly secured in horizontal positions to the machine frame. These drag bars 15 are arranged in front and rear rows and are of alternate long and short lengths. The long drag bars 15 of the front row are extended rearward of the intermediate frame bar 4, and the short bars thereof terminate with said bar 4. All of the drag bars 15 of the rear row are extended rearward of the machine frame. Pivotally secured between the members of each drag bar 15 for vertical swinging movement is a supporting head 16. All of these supporting heads 16 are secured to the extreme rear ends of the drag bars 15 with the exception of the ones secured to the short drag bars of the front row, and they are intermediately secured thereto. Downwardly and forwardly curved legs 17 are adjustably secured by clips 18 to the depending portions of the supporting heads 16. Diamond-shaped ground working shovels or hoes 19 are pivotally secured to the lower ends of the legs 17 by clamping bolts 20. By these clamping bolts 20, either one of the vertical points of the ground working tools may be rigidly held toward the ground. Shearing pins 21 are passed through the forwardly projecting portions of the supporting heads 6, engage the upper edges of the drag bars 15, and thereby hold the legs 17 against rearward movement under ordinary strains, but will break when the ground engaging tools engage an obstruction such as a root or stone. A seat 22 for the operator is secured to the rear end portion of the pole 11.

From the foregoing description it is evident that by manipulating the latch levers 9 the ground working tools 19 may be set different distances into the ground. As these ground-working tools 19 are dragged through the soil, the quack grass will be pulled up by the roots and carried to the surface of the ground. The ground-working tools 19 are set quite close together, transversely of the machine, so that all of the quack grass will be pulled up, but adjacent ground-working tools are set considerably one in advance of the other so that the pulled up quack grass will freely pass therebetween and not clog up the machine.

The above described machine has, in actual usage, proven highly efficient for the purpose had in view.

What I claim is:

In a machine of the kind described, the combination with a crank axle having a pair of wheels journaled on its ends, of a rectangular frame pivotally secured to and projecting both forward and rearward of the intermediate portion of the crank axle, means for locking the frame to the crank axle in different adjustments, a stub pole rigidly secured to the frame, a truck wheel supporting the front end of the stub pole, laterally spaced pairs of drag bars rigidly secured to the frame, and a ground-working tool secured to and between each pair of drag bars.

In testimony whereof I affix my signature in presence of two witnesses.

FRANK KLOSE.

Witnesses:
J. A. LUND,
C. R. MANWARING.

Copies of this patent may be obtained for five cents each, by addressing the "Commissioner of Patents, Washington, D. C."